Oct. 18, 1932.  C. F. RICHARD  1,883,233
FILLING AND WEIGHING MACHINE
Filed April 5, 1929  2 Sheets-Sheet 1
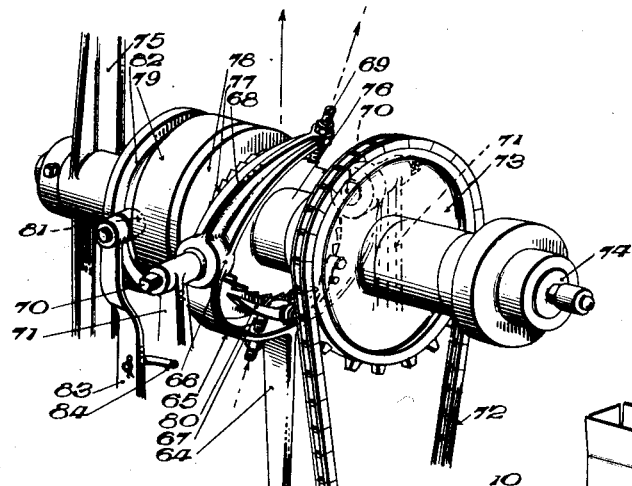
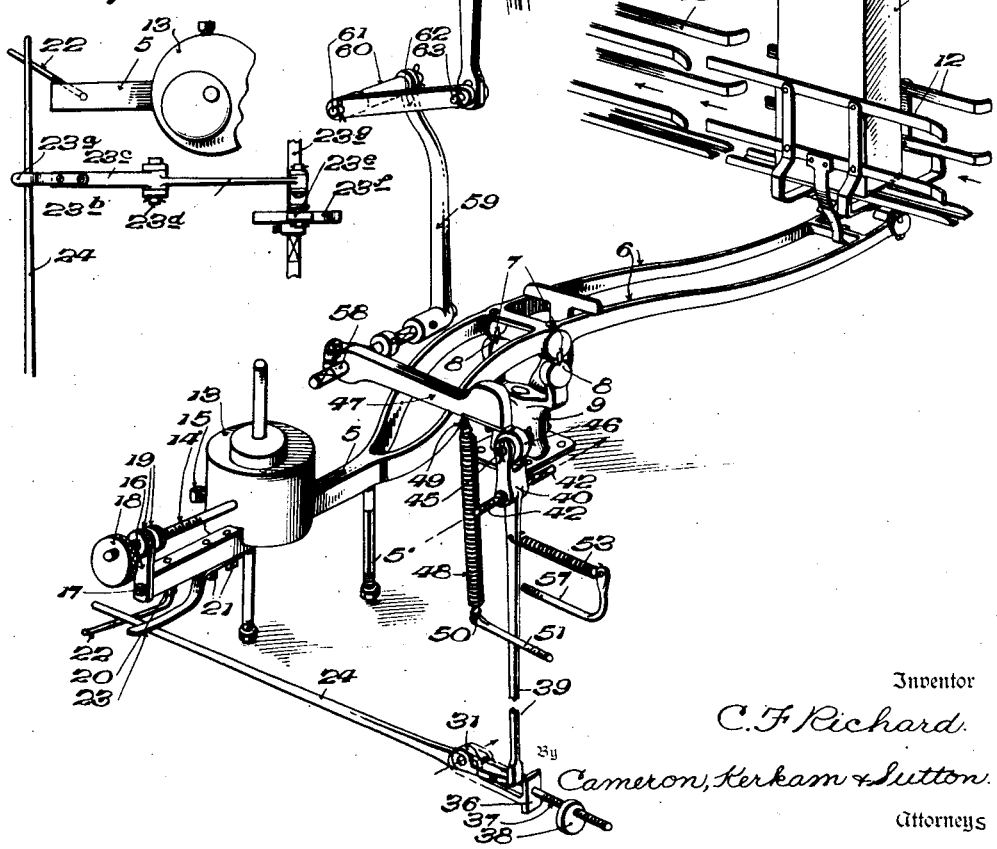
Inventor
C. F. Richard.
By Cameron, Kerkam & Sutton.
Attorneys Oct. 18, 1932.  C. F. RICHARD  1,883,233
FILLING AND WEIGHING MACHINE
Filed April 5, 1929  2 Sheets-Sheet 2
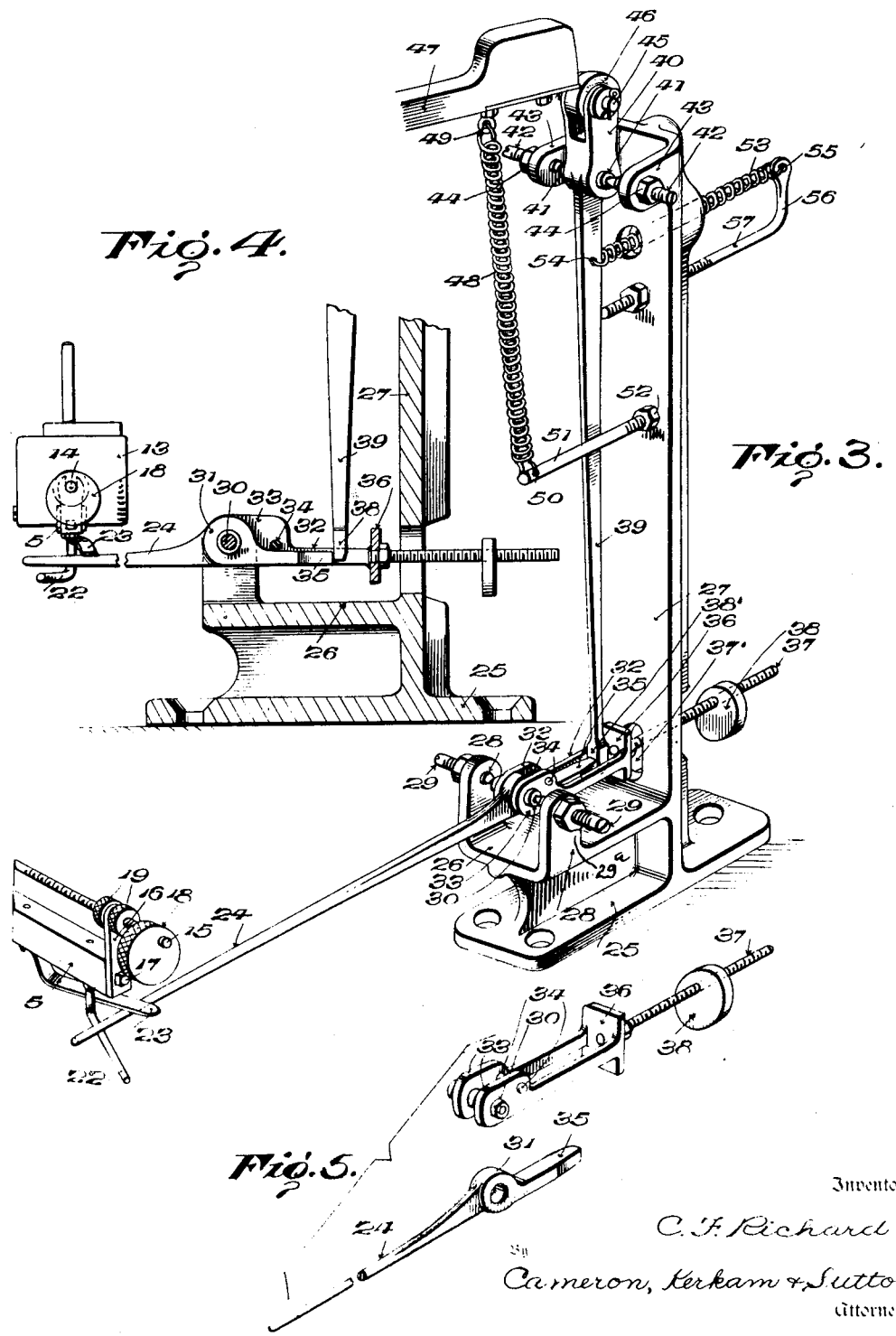

Patented Oct. 18, 1932

1,883,233

UNITED STATES PATENT OFFICE

CHARLES F. RICHARD, OF BATTLE CREEK, MICHIGAN, ASSIGNOR TO JOHNSON AUTOMATIC SEALER CO., LTD., OF BATTLE CREEK, MICHIGAN, A PARTNERSHIP ASSOCIATION LIMITED OF MICHIGAN

FILLING AND WEIGHING MACHINE

Application filed April 5, 1929. Serial No. 352,854.

This invention relates to automatic filling and weighing machines, and more particularly to trip mechanism employed in conjunction with the scales and the dispensing apparatus control devices of said machines.

One object of the invention is to provide improved mechanism of this character which stops the operation of the dispensing apparatus at the instance a container receiving material threrfrom is filled to a predetermined weight.

Another object of the invention is to provide an improved trip mechanism which enables the scale to trip it and stop the operation of the dispensing apparatus upon delivery of an extremely small amount of material therefrom into a container on the scale.

Another object of the invention is to provide an improved trip mechanism which is extremely sensitive and thus insures accurate weighing of packages or the like by the scale.

Another object of the invention is to provide a trip mechanism which is counterbalanced to insure immediate operation thereof by the scale.

Another object of the invention is to provide a simple and inexpensive trip mechanism that can be readily installed on a filling and weighing machine and which considerably increases the efficiency thereof.

In order to more fully understand the invention, reference may be had to the appended drawings which illustrate one embodiment of the inventive idea and wherein:

Fig. 1 is a detail perspective view of trip mechanism embodying the present invention and associated with a scale and dispensing apparatus control devices;

Fig. 2 is a top plan view of scale controlled means embodying the present invention and adapted to trip and reset a lever of said trip mechanism;

Fig. 3 is an enlarged detail perspective view of the trip mechanism shown in Fig. 1;

Fig. 4 is an enlarged, fragmentary side view, partly in section, of said mechanism; and Fig. 5 is a detail perspective view of a counterweighted trip lever the parts of which are shown separated for purposes of clearer illustration.

Referring to the drawings, wherein like reference characters designate like parts throughout the several views, said drawings show a scale, a trip mechanism embodying a counterweighted trip lever and a plurality of operatively related elements, and control devices for dispensing or filling apparatus (not shown) adapted to deliver material into a container on the scale. These instrumentalities will be described in the order named, and are preferably constructed and operated as follows:

The scale comprises a beam 5 provided with a fork 6 and pivoted on knife edges 7, 7 and 8, 8 carried on said fork and a bracket 9, respectively. The bracket 9 is bolted or otherwise suitably secured on the machine frame work (not shown) of a filling and weighing machine, which, for example, may be constructed along the lines of the machine shown in the application of George A. Robinson, Serial No. 71,338, filed November 25, 1925, and includes a way 10 (Fig. 1) along which cartons or containers such as indicated at 11 are intermittently advanced to be filled and weighed by said machine.

For this purpose, the scale beam 5, which is limited in its downward movement by a pin 5' secured to the machine framework, is provided on the fork 6 with a pan or tray 12 alined with the way 10 and adapted to support the container 11 while it is being filled to a predetermined weight with material by the dispensing apparatus (not shown) of the filling and weighing machine. The tray 12 is bolted or otherwise suitably secured on the fork 6 at one side of the knife edge pivots 7, 7 and 8, 8 and at the opposite side of said pivots, the scale beam 5 is provided with a weight 13 that can be adjusted along said scale beam and retained in position thereon by a threaded shaft 14 and a set screw 15, respectively. The threaded shaft 14 is mounted in a bracket 16 secured at 17 to the end of the scale beam 5. Said threaded shaft is operated by a knurled head 18 and may be retained against accidental displacement by lock nuts 19, 19 carried on said shaft at opposite sides of the bracket 16, respectively.

Fixed on the scale beam 5, as at 20 and 21, 21, are a pair of laterally and vertically spaced fingers 22, 23, respectively, that project rearwardly from said scale beam and act to trip and reset a pivotally mounted, counter-weighted trip lever 24 forming part of the trip mechanism to be presently described. Assuming that the weight 13 is adjusted on the scale beam 5 so that the latter will move upwardly when the container 11 is filled to a predetermined weight, it will appear that when the scale is tripped, the finger 22 will swing the counterweighted trip lever 24 upwardly. The filled and weighted container is then removed from the scale pan 12, whereupon the scale beam 5 drops and the finger 23 resets the counterweighted trip lever 24. The trip lever 24 may, however, be reset by a finger 23a (Fig. 2) secured as at 23b, 23b, on one end of a lever 23c that is pivoted at 23d on the machine framework. This lever is spring operated in one direction and cam operated in the opposite direction, and said lever has journalled thereon a roller 23e. The roller 23e is engaged by a cam 23f which is fixed on a scale controlled shaft 23g journalled on the machine framework and intermittently driven in any suitable manner to swing the finger 23a and reset the trip lever 24 after the scale and the trip mechanism have been tripped.

The trip mechanism is preferably operated and constructed as follows. Bolted or otherwise suitably secured on the machine framework, is an L-shaped bracket 25 (Figs. 3 and 4) having a horizontally extending arm 26 and a vertically extending arm 27. Secured to or formed integrally with the arm 26, are spaced, vertical ears 28, 28 through the apertured upper ends of which are threaded pivot pins 29, 29. These pivot pins have tapered pointed ends projecting inwardly toward each other between the ears 28, 28, and engaging tapered recesses formed in the opposite ends of a pin 30 that forms the pivot for the lever 24. The lever 24 is provided between its opposite ends with an apertured boss 31 through which the pin 30 extends to engage the pins 29, and the pins 29 may be adjusted, as desired, by nuts 29' threaded thereon and serving to prevent endwise displacement of said pins with respect to the pivot pin 30.

One end of the lever 24 extends between the fingers 22, 23 and the opposite end of said lever extends into a yoke 32 that is pivoted on the pin 30. This yoke carries enlarged apertured ears that receive the pin 30 and between which extends the apertured boss 31 of the lever 24. Fixed on the ears 33 of the yoke 22, are pins 34, 34 which are disposed at one side of the pin 30 and are normally adapted to continuously engage the nose 35 of lever 24 on the top thereof. It will thus appear that the yoke 32 will move up and down with the lever 24 in accordance with like movement imparted thereto by the scale beam 5 and the fingers 22, 23, and that said yoke may be swung relatively to the lever 24 if desired.

Fixed on the enlarged end 36 of the yoke 32, is a threaded shaft 37 that projects from said yoke through an elongated vertical slot 37' formed in the arm 27 by bracket 25. The shaft 37 has threaded engagement with the walls of a suitable opening formed in a counterweight 38 that is mounted on said shaft for adjustment therealong to any desired position. In the untripped position of the mechanism, the nose 35 of the lever 24 engages the nose 38' formed on the lower end of a vertical trip lever 39 and extending into the yoke 32 between the end of the lever 24 and the enlarged end 36 of said yoke. The lever 39 is pivotally mounted on the arm 27 of bracket 25, and for this purpose, said lever is enlarged at its upper end to provide a fork 40. Projecting from the opposite sides of the fork 40 near the bottom thereof, are brackets 41 having inwardly tapered openings therein that receive the tapered points of pivot pins 42. These pivot pins have threaded engagement with the walls of suitable openings formed in ears 43 between which the yoke 40 extends in spaced relation therewith. The ears 43 are secured to or formed integrally with the bracket arm 27 and project horizontally therefrom as clearly shown in Fig. 3.

The pins 42 are secured in desired positions of adjustment by nuts 44 threaded thereon and bearing against the ears 43 on the outer sides thereof. Journalled at 45 in the yoke 40 is a roller 46 which is engaged by the free end of a lever 47. The lever 47, through the action of a spring 48, normally acts to hold the nose 38' of lever 39 in engagement with the nose 35 of lever 24. This spring 48 has its opposite end secured, as at 49, 50, to the lever 47 and a pin 51 respectively. The pin 51 is secured at 52 on the bracket arm 27 and projects horizontally therefrom as clearly shown in Fig. 3. A second spring 53 acts, after tripping of the described mechanism, to reset the lever 39 and engage the nose 38' thereof with the nose 35 of lever 24. This spring 53 has its opposite ends secured, as at 54, 55, to the lever 39 and the bent end 56 of a pin 57, respectively. The pin 57 extends through and has threaded engagement with the wall of a suitable opening formed in the bracket arm 27, and the straight end of said pin forms a stop to limit swinging movement of the arm 39 in a counterclockwise direction (Fig. 3) about the pivot pin 42.

The dispensing apparatus control devices are connected with the lever 47 and said devices are preferably constructed, and operated as follows. The lever 47 is fixed on a rock shaft 58 that is journalled in suitable bearing on the machine framework. The rock shaft 58 also has fixed thereon an arm 59 that is pivotally connected by a sleeve 60 and a pin 61 therein, with one extremity of a link 62. The opposite extremity of the link 62 is pivotally connected as at 63, with an arm 64 secured to or formed integrally with one arm 65 of a yoke 66. The arm 65 of said yoke carries a pin 67, and the other arm 68 of the yoke carries a pin 69. The yoke arms 65, 68 are pivotally mounted as at 70, 70, on brackets 71, 71, which are bolted or otherwise suitably secured to the machine framework.

Driven from any suitable source of power, as by a chain 72, is a sprocket 73, which is loosely mounted on a shaft 74 journalled in suitable bearings on brackets or the like one of which is indicated at 75. These brackets are bolted or otherwise suitably secured to the machine framework, and the sprocket 73 has formed integrally therewith a sleeve 76 through which the shaft 74 extends. Fixed on the sleeve 76 is a ratchet 77 which, together with the sprocket 73 is continuously rotated on the shaft 74. Rigidly mounted on the shaft 74 are a pawl carrier 78 and a cam 79, the pawl carrier 78 carrying a spring pressed pawl 80 forming with a ratchet 77 a clutch for driving the shaft 74.

While the package 11 is being weighed on the scale 5, 6, the pawl 80 is held out of contact with the ratchet 77 by the pin 67 of the yoke arm 65. When the scale is tripped, lever 24 is lifted by finger 22 so that the nose 35 of said lever is disengaged from the nose 36 of the lever 39. The spring 48 then pulls the lever 47 downwardly and through the described connections for said lever with the arm 64, the latter is swung to the right (Fig. 1) thus disengaging the pin 67 from pawl 80 so that the latter is engaged with the ratchet 77 to drive the shaft 74 and the cam 79. The cam 79 then acts through engagement of a roller 81 in the groove 82 thereof, to swing in one direction, a lever 83 which carries said roller and is pivoted in any suitable manner on the machine framework. This lever 83 has connected therewith one extremity of a rod 84 that acts when the lever is swung by the cam 79 in said direction, to stop the operation of the dispensing apparatus and prevent delivery therefrom of material into the container 11. When this dispensing apparatus is stopped, the pin 69, which has been swung by the yoke 66 into the path of travel of the pawl 80, engages said pawl and releases it from the ratchet 77.

When the container 11 is removed from the scale pan 12, the scale beam 5 acts through engagement of the finger 23 with the lever 24 to reset said lever so that the nose 35 thereof engages the nose 38' of lever 39 which has previously been reset by the lever 47 and the spring 53. The lever 47 is reset by any suitable mechanism for this purpose (not shown) and a second container is placed on the scale pan 12 to receive material from the dispensing apparatus. When the lever 47 is reset as above mentioned, it acts, through the described connections therefore with the arm 64, to swing the yoke 66 so that pin 69 is disengaged from pawl 80. The pawl 80 is thus allowed to again engage the ratchet 77 to drive a shaft 74 and cam 79 so that the latter swings the arm 83 in a direction opposite to that of its first swinging movement and starts the operation of the dispensing apparatus to fill the second container on the scale pan 12. When this container is filled the scale is tripped and the dispensing apparatus is stopped as before described.

These operations are repeated as containers are successively placed on the scale, weighed, and removed therefrom and by the provision of the counterweighted trip lever 24, the described mechanism is rendered very sensitive to the action of the scale beam and immediately acts on tripping thereof to stop the operation of the dispensing apparatus. It will further appear that the counterweighted trip lever 24 insures extremely accurate weighing by the scale and enables the dispensing apparatus to be immediately stopped upon the delivery of an extremely small amount of material into the container to bring it up to predetermined weight.

While one embodiment of the inventive idea is herein illustrated and described with more or less particularity, it is to be expressly understood that the invention is not limited to said embodiment, or otherwise than by the terms of the appended claims.

What is claimed is:

1. The combination with a scale, dispensing apparatus control devices, and a plurality of operatively related elements for controlling the operation of said control devices, of a scale operated member for controlling the operation of said elements, and an adjustable counterbalancing device operatively associated with said member and mounted for movement therewith in one direction and for movement relative thereto in the opposite direction.

2. The combination with a scale, dispensing apparatus control devices, and a plurality of operatively related elements for controlling the operation of said control devices, of a pivotally mounted scale operated member adapted to control the operation of said elements, and an adjustable counterweight operatively associated with said member so as to normally urge it in one direction about its pivot, said counterweight being also mounted for pivotal movement relative to said member so as to permit movement of the latter independently of said counterweight.

3. The combination with a scale, dispensing apparatus control devices, and a plurality of operatively related elements for controlling the operation of said control devices, of a pivoted, scale operated trip member adapted to control the operation of said elements, and a counterbalancing device operatively associated with said trip member and normally urging the latter to tripped position, said counterbalancing device being adjustable with respect to said trip member so that said member may be calibrated to operate instantly upon operation of the scale.

4. The combination with a scale, dispensing apparatus control devices, and a plurality of operatively related elements for controlling the operation of said control devices, of a pivoted scale controlled trip lever for controlling said elements a pivoted member operatively associated with the trip lever, and a counterweight mounted on said pivoted member and normally tending to move said member about its pivot in a direction to urge said trip lever to tripped position.

5. The combination with a scale, dispensing apparatus control devices, and a plurality of operatively related elements for controlling the operation of said control devices, of a scale operated trip lever for controlling the operation of said elements, a pivoted yoke engaged with said trip lever and into which one of said elements is adapted to project for engagement therewith, and a counterweight carried by said pivoted yoke.

6. The combination with a scale, dispensing apparatus control devices, and a plurality of operatively related elements for controlling the operation of said control devices, of a trip lever for controlling the operation of said elements, an adjustable counterweight for the trip lever whereby it may be calibrated to trip instantly upon operation of the scale, and scale controlled means for moving said trip lever in opposite directions to trip and reset the same respectively.

7. The combination with a scale, dispensing apparatus control devices, and a plurality of operatively related elements for controlling the operations of said control devices, of a scale operated trip lever for controlling the operation of said elements, a counterweight for the trip lever adjustable in the direction of its length to calibrate said lever and insure tripping of the same at the instant the scale is operated, and scale controlled means for resetting the trip lever after it has been tripped.

8. In combination with a scale, a plurality of operatively related control members, a trip lever adapted to control the operation of said members through engagement with and disengagement from one of the same, a pivoted element supported on said trip lever, and a counterweight carried by said pivoted element and adjustable in the direction of the length of the trip lever to calibrate the same and insure instant tripping thereof when the scale is operated.

9. In combination with a scale, a pivoted element, a plurality of operatively related control members, a trip lever supporting said pivoted element at one side of its pivotal axis and adapted to control the operation of said control members through engagement with and disengagement from one of the same, and means on said pivoted element adjustable in the direction of the length of said trip lever whereby it may be calibrated to trip instantly upon operation of the scale.

10. In combination with a scale, a plurality of operatively related control members, a pivoted trip lever adapted to control the operation of said members through engagement with and disengagement from one of the same, a pivoted element normally adapted to be continuously engaged with said trip lever to move therewith in opposite directions, a counterweight carried by said pivoted element, and means providing for adjustment of said counterweight to various positions whereby the trip lever may be calibrated to trip instantly upon operation of the scale.

11. In combination with a scale, a plurality of operatively related control members, a pivoted trip lever for controlling the operations of said members, a counterweight for said trip lever arranged for swinging movement therewith and about the pivotal axis thereof, and means providing for adjustment of said counterweight in the direction of the length of the trip lever whereby the latter may be calibrated to trip instantly upon operation of the scale.

12. In combination, control mechanism, a trip lever therefor, a pivoted yoke engaged with the trip lever and adapted to receive one end of the latter and an element of said control mechanism, a counterweight carried by said pivoted yoke, and means for adjusting the counterweight in the direction of the length of said trip lever.

13. In combination with a scale, a pivoted trip member, a yoke supported on said trip member for swinging movement therewith and about the pivotal axis thereof, mechanism controlled by said trip lever, and a counterweight mounted on said yoke for adjustment to various positions whereby the trip lever may be calibrated to trip instantly upon operation of the scale.

14. In combination with a scale, a pivoted trip lever, a yoke arranged for swinging movement about the pivotal axis of said trip lever, means for supporting the yoke on the trip lever to move therewith, mechanism controlled by the trip lever, and a counterweight mounted on said yoke for adjustment to various positions whereby the trip lever may be calibrated to trip instantly upon operation of the scale.

15. In combination, a pivoted trip lever, a yoke adapted to receive one end of said trip lever and arranged for swinging movement about the pivotal axis thereof, pins on the yoke adapted to support it on the trip lever, a counterweight carried by the yoke, and mechanism controlled by the counterweighted trip lever and having a part adapted to extend in the yoke and engage said end of the trip lever.

In testimony whereof I have signed this specification.

CHARLES F. RICHARD.